Patented July 3, 1934

1,964,863

UNITED STATES PATENT OFFICE 1,964,863

PROCESS OF PREPARING AN ORGANIC ARSENIC COMPOUND CAPABLE OF BEING INJECTED WITHOUT CAUSING ANY IRRITATION

Karl Streitwolf, Frankfort-on-the-Main, Alfred Fehrle, Bad-Soden on Taunus, and Julius Hallensleben, Frankfort-on-the-Main-Hochst, Germany, assignors to Winthrop Chemical Company, Inc., New York, N. Y., a corporation of New York No Drawing. Application August 2, 1929, Serial No. 383,151. In Germany September 7, 1928

2 Claims. (Cl. 260—15)

The present invention relates to a process of preparing an organic arsenic compound capable of being injected without causing irritation.

It is known that substances yielding stable solutions are formed by the introduction of acid groups, especially of the formaldehydesulfoxyl group, into the amino groups of arsenobenzenes which are themselves unstable in solution. The formaldehydebisulfite compounds of amino-arseno compounds have, however, when prepared according to the usual methods, the disadvantage that they cause a marked irritation when injected intramuscularly. We have found that the diformaldehyde-bisulfite compound of arseno-(1-phenyl-2.3-dimethyl-4-amino-5-pyrazolone) of the following formula:

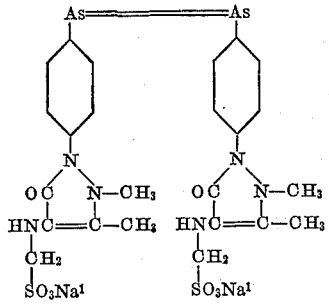

can be converted by suitable treatment into a product having in solution a low hydrogen ion concentration and capable of being injected without causing irritation. For this purpose, there is added to an aqueous solution of the aforesaid compound a suitable proportion of a salt of alkaline reaction, such as sodium sulfite, sodium carbonate, sodium phosphate or the like, and the new product is isolated by precipitation by means of alcohol and ether. The one per cent. aqueous solution of the product must not be more acid than pH 4, so that the hydrogen ion concentration of this solution is less than pH 4; it may, for instance, be pH 4.5; the said proportion may easily be determined by a preliminary experiment.

The product thus obtained is superior, as regards its non-irritant property, to hitherto known arsenic compounds applicable for intramuscular injection and it has also a very good curative power. Its therapeutic value is therefore very high.

The following example serves to illustrate our invention but is not intended to limit it thereto.

172 g of the hydrochloride of para-arseno-(1-phenyl - 2.3-dimethyl-4-amino-5-pyrazolon) are stirred in 360 cc. of methyl alcohol and 800 cc. of water are then added. To the solution so prepared are added, drop by drop, first 68 cc. of a sodium bisulfite solution of 38 per cent strength, and then 68 cc. of formaldehyde of 30 per cent strength, and the whole is stirred for a short time. Then a further 84 cc. of the sodium bisulfite solution are introduced, whereupon the precipitate which has formed during the addition of the formaldehyde passes into solution. To the solution are added 384 cc. of a solution prepared by dissolving 92 g of crystallized sodium sulfite in 368 cc. of water, the whole is filtered and the filtrate is run into 9.6 liters of alcohol mixed with 960 cc. of ether. The resulting precipitate is filtered by suction, washed with alcohol and ether and dried in a vacuum. The preparation constitutes a yellow powder which is readily soluble in water, the hydrogen ion concentration of a solution of the product of 1 per cent. strength corresponding with pH 4.5. Instead of sodium sulfite there may be used any other salt of alkaline reaction, such as, for instance, sodium carbonate, sodium phosphates etc.

We claim:

1. The process of preparing an organic arsenic compound capable of being injected without causing irritation which comprises adding to the aqueous solution of diformaldehyde-bisulfite-arseno-(1-phenyl-2.3-dimethyl-4-amino-5-pyrazolon) a sodium salt of an inorganic acid of alkaline reaction until the hydrogen ion concentration of the one per cent. aqueous solution is about pH 4.5 and then precipitating by means of alcohol and ether.

2. The process of preparing an organic arsenic compound capable of being injected without causing irritation which comprises adding to the aqueous solution of diformaldehyde-disulfite-arseno-(1-phenyl-2.3-dimethyl-4-amino-5-pyrazolon) sodium sulfite until the hydrogen ion concentration of the one per cent. aqueous solution would be about pH=4.5 and then precipitating by adding the solution thus obtained to a mixture of alcohol and ether.

KARL STREITWOLF.
ALFRED FEHRLE.
JULIUS HALLENSLEBEN.